United States Patent Office.

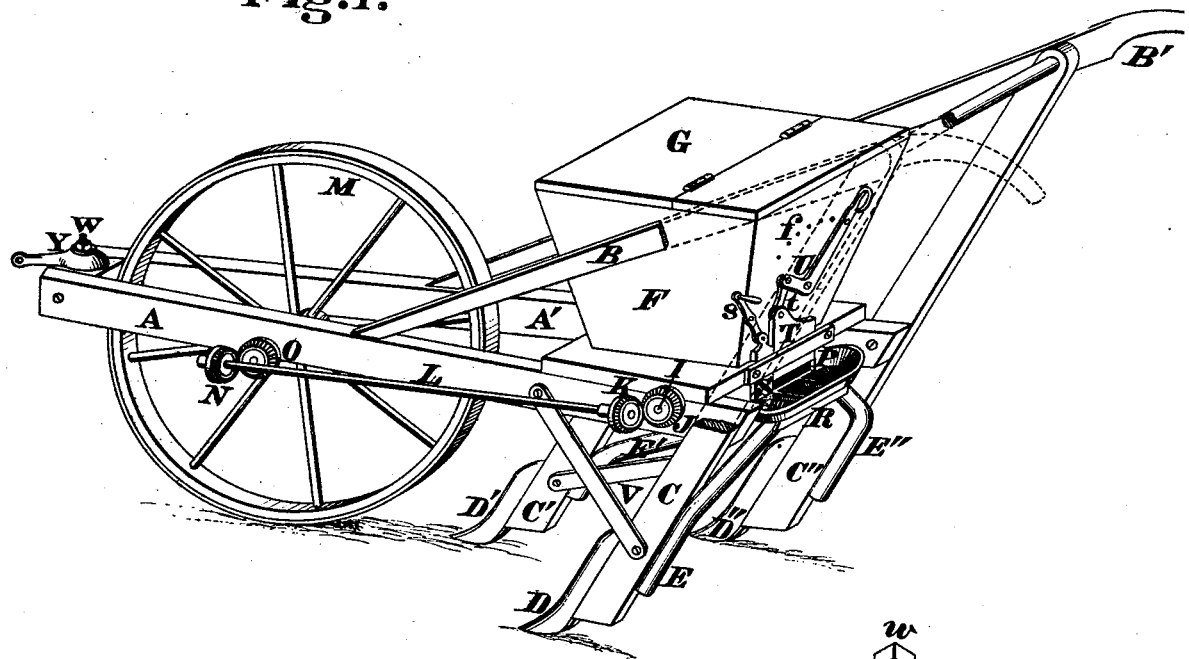
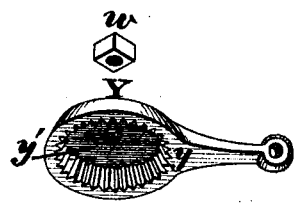
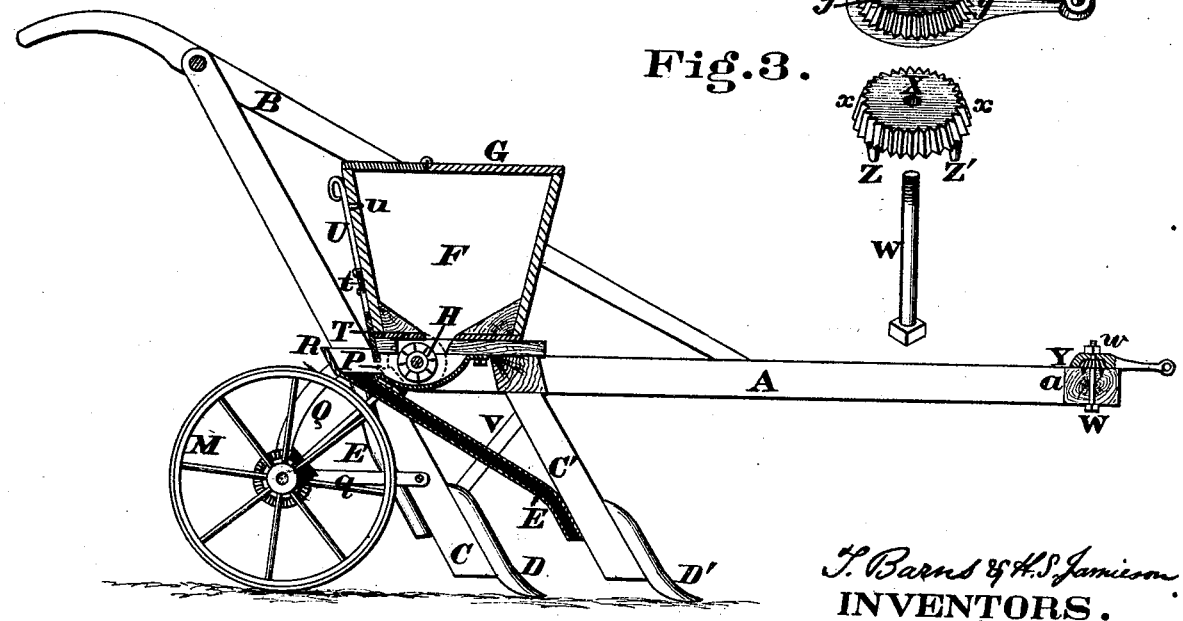

TURNER BARNS AND HUGH S. JAMISON, OF GREENSBURG, INDIANA.

Letters Patent No. 111,421, dated January 31, 1871.

IMPROVEMENT IN GRAIN-DRILLS.

The Schedule referred to in these Letters Patent and making part of the same.

We, TURNER BARNS and HUGH S. JAMISON, both of Greensburg, Decatur county, Indiana, have invented a new and useful "Grain-Drill," of which the following is a specification.

Nature and Objects of the Invention.

This is an improvement in the class of grain-drills adapted to be drawn over the ground by animal power, and whose seeding mechanism is impelled by connection with a ground-wheel; and The first part of our invention relates to a provision whereby the implement is adapted to sow either two or three rows at will, the same provision enabling a regulation of the grain-ducts, for passing a greater or lesser quantity or number of kernels.

The second part of our invention relates to an adjustable clevis, to regulate or counteract the side-draft, which is detrimental to the action of grain-drills.

General Description with Reference to the Drawing.

Figure 1 is a perspective rear view of a grain-drill embodying our invention, a portion of one handle and sheath being omitted;

Figure 2 is a longitudinal section of the implement, showing the ground-wheel attached to the rear of the frame; and Figure 3 shows the parts of our clevis detached and on an enlarged scale.

The beams A A', handles B B', sheaths C C', shares or shovels D D' D", and grain-spouts or tubes E E' E", being similar to those of most grain-drills, require no further description.

Mounted upon the beams A A', and near the rear ends of the same is a grain-box, F, having at top a hinged lid, G, and at bottom a feed-wheel, H, which is secured to a shaft, I, having at one end a bevel-wheel, J.

The wheel J gears with another beveled one, K, upon a counter-shaft, L, which is rotated from the ground-wheel M, through the medium of bevel-gears N and O, the latter being secured to the axle of said ground-wheel.

The feed-wheel H delivers the grain through an aperture, P, in box F, into a large open-mouthed hopper, R, with which the upper ends of all the grain-spouts communicate.

The quantity of grain which is discharged through said opening P is regulated by two gates or cut-offs, S and T, the larger of which, T, is operated by a bell-crank lever, U, and link t.

The lever U has a pin, u, which is adapted to engage in either one of a series of apertures, f, in the grain-box, and, by so doing, to maintain the gate T at any desired elevation.

The smaller cut-off S is operated by a lever, s.

V are braces for stiffening the sheaths of the drill.

The bar a, which unites the two front ends of the beams A A', is traversed by a bolt, W, which, after passing through the disk X and clevis Y, is secured by a nut, w.

The edges of the disk X are somewhat inclined, as shown in fig. 3, and are provided with teeth $x$, that are adapted to engage with indentations $y$, around the inner periphery of the recessed portion $y'$ of the clevis Y.

Projecting from the under side of the disk X are studs Z Z', which prevent the rotation of said disk by becoming embedded in the beam a, whenever the nut w is screwed home.

In fig. 2 the ground-wheel M is shown as located in the rear of the implement, and is journaled in hangers Q, which are attached to the beams A, and these hangers are stiffened by braces q, that are secured to the sheaths.

In this position of the ground-wheel the feed-mechanism H I may be operated either by gearing or belts, as may be most desirable.

Whenever it is desired to sow three rows of grain, both of the gates S and T are opened, thereby allowing the grain to be discharged through the spouts E E' E", but when only two rows are to be planted, the gate S is closed, and the grain is then discharged through the tubes E' E".

By simply unscrewing the nut w, the clevis Y can be lifted from off the disk X, and after being set to any convenient angle, is again placed upon said disk and secured by the nut, the teeth $x$ and indentations $y$ preventing the accidental displacement or turning of said clevis.

We do not claim, broadly, operating the seeding mechanism of a grain-drill by gearing from the ground-wheel, nor do we claim any and every arrangement for adapting a grain-drill for sowing either two or three rows, at the will of the operator.

Claim.

We claim as our invention—

The combination of the cut-offs S and T, with the hopper R, whereby one, two, or three drills may be sown at a time, as desired, as and for the purposes set forth.

In testimony of which invention we hereunto set our hands.

TURNER BARNS.
HUGH S. JAMISON.

Witnesses:
 GEO. H. KNIGHT,
 WILLIAM H. POWNER.